(12) United States Patent
Hamabe et al.

(10) Patent No.: US 6,563,667 B1
(45) Date of Patent: May 13, 2003

(54) CASSETTE DECK MECHANISM FOR MOUNTING/DISCHARGING DIFFERENT SIZE CASSETTES USING A PIVOTED ARM

(75) Inventors: Seiya Hamabe, Kanagawa (JP); Morihiro Deura, Kanagawa (JP); Ryuji Kusumi, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 09/677,804

(22) Filed: Oct. 2, 2000

(30) Foreign Application Priority Data

Sep. 30, 1999 (JP) .......................................... 11-280015

(51) Int. Cl.[7] .......................................... G11B 15/675
(52) U.S. Cl. ........................................ 360/94; 360/96.5
(58) Field of Search .................................. 360/94, 96.5

(56) References Cited

U.S. PATENT DOCUMENTS

| | | | | |
|---|---|---|---|---|
| 5,739,979 A | * | 4/1998 | Busch | 360/94 |
| 5,793,565 A | * | 8/1998 | Suzuki | 360/94 |
| 5,889,632 A | * | 3/1999 | Aoki | 360/94 |
| 5,956,202 A | * | 9/1999 | Suzuki | 360/94 |

\* cited by examiner

Primary Examiner—Jefferson Evans
(74) Attorney, Agent, or Firm—Jay H. Maioli

(57) ABSTRACT

A cassette deck that can use either a large cassette or a small cassette and can move the small cassette with certainty to a position at which the small cassette can be taken out manually. The cassette deck includes a housing, and a mounting and discharging mechanism capable of mounting and discharging any of a small cassette and a large cassette. The mounting and discharging mechanism includes a moving mechanism for pushing at a rear face of the small cassette to move the small cassette to a position at which the small cassette can be manually taken out. The moving mechanism provided on a lid member includes a pivotal arm mounted for pivotal back and forth movement over approximately 180 degrees on the inner side of the housing.

6 Claims, 6 Drawing Sheets

CASSETTE DECK MECHANISM FOR MOUNTING/DISCHARGING DIFFERENT SIZE CASSETTES USING A PIVOTED ARM

BACKGROUND OF THE INVENTION

This invention relates to a cassette deck, and more particularly to a discharging mechanism for a small cassette of a cassette deck in which both of a small cassette and a large cassette can be used.

Various cassette decks are conventionally known including a compatible mechanical cassette deck wherein a small cassette also called S cassette and a large cassette also called L cassette can be used commonly in the same mechanical deck. Since the small cassette and the large cassette are physically different from each other in terms of the width and the depth, the compatible mechanical deck uses different discharging amounts to discharge the small and large cassettes. In order to discharge the small and large cassettes to the same discharged position although the discharging amounts for them are different, a discharging mechanism for further moving the small cassette to a position from which the small cassette can be taken out manually must be provided separately or additionally. The discharging mechanism includes a rubber roller which frictionally rotates on the surface of the small cassette to discharge the small cassette to the position at which it can be manually taken out.

In the conventional cassette deck, however, since the mechanism for discharging a small cassette drives a small cassette to move to the position at which the small cassette can be taken out manually making use of frictional engagement of the rubber roller with the small cassette, it has a problem in that a slip or the like phenomenon occurs as a result of abrasion of the rubber roller or intervention of dust and accurate discharging of the small cassette cannot be secured.

SUMMARY OF THE INVENTION

It is an object of the present invention to provide a cassette deck which can use both of a large cassette and a small cassette and can move the small cassette with certainty to a position at which the small cassette can be taken out manually.

In order to attain the object described above, according to the present invention, there is provided a cassette deck, comprising a housing, and a mounting and discharging mechanism capable of mounting and discharging any of a small cassette and a large cassette, the mounting and discharging mechanism including moving means for pushing at a rear face of the small cassette to move the small cassette to a position at which the small cassette can be manually taken out.

The cassette deck may be constructed such that it further comprises a mechanical deck in which a loading mechanism for loading the small cassette or the large cassette in position is incorporated, and the moving means is provided on a lid member of the mechanical deck.

The moving means may include a pivotal arm mounted for pivotal back and forth movement over approximately 180 degrees on the inner side of the housing. Preferably, the moving means further includes a gear train composed of a plurality of speed reduction gears, and the pivotal back and forth movement over approximately 180 degrees of the pivotal arm is provided by the gear train. Preferably, the pivotal back and forth movement over approximately 180 degrees is limited by mechanical stoppers.

The moving means may include a pair of pivotal arms mounted for pivotal back and forth movement over approximately 180 degrees on the inner side of the housing for pushing at the opposite end positions of the rear face of the small cassette.

With the cassette deck, the small cassette is pushed at the rear face thereof in order to move the small cassette to the position at which the small cassette can be manually taken out. Consequently, the cassette deck is advantageous in that the small cassette can be moved from the discharging position to the taking out position with certainty while the cassette deck is simple in structure.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
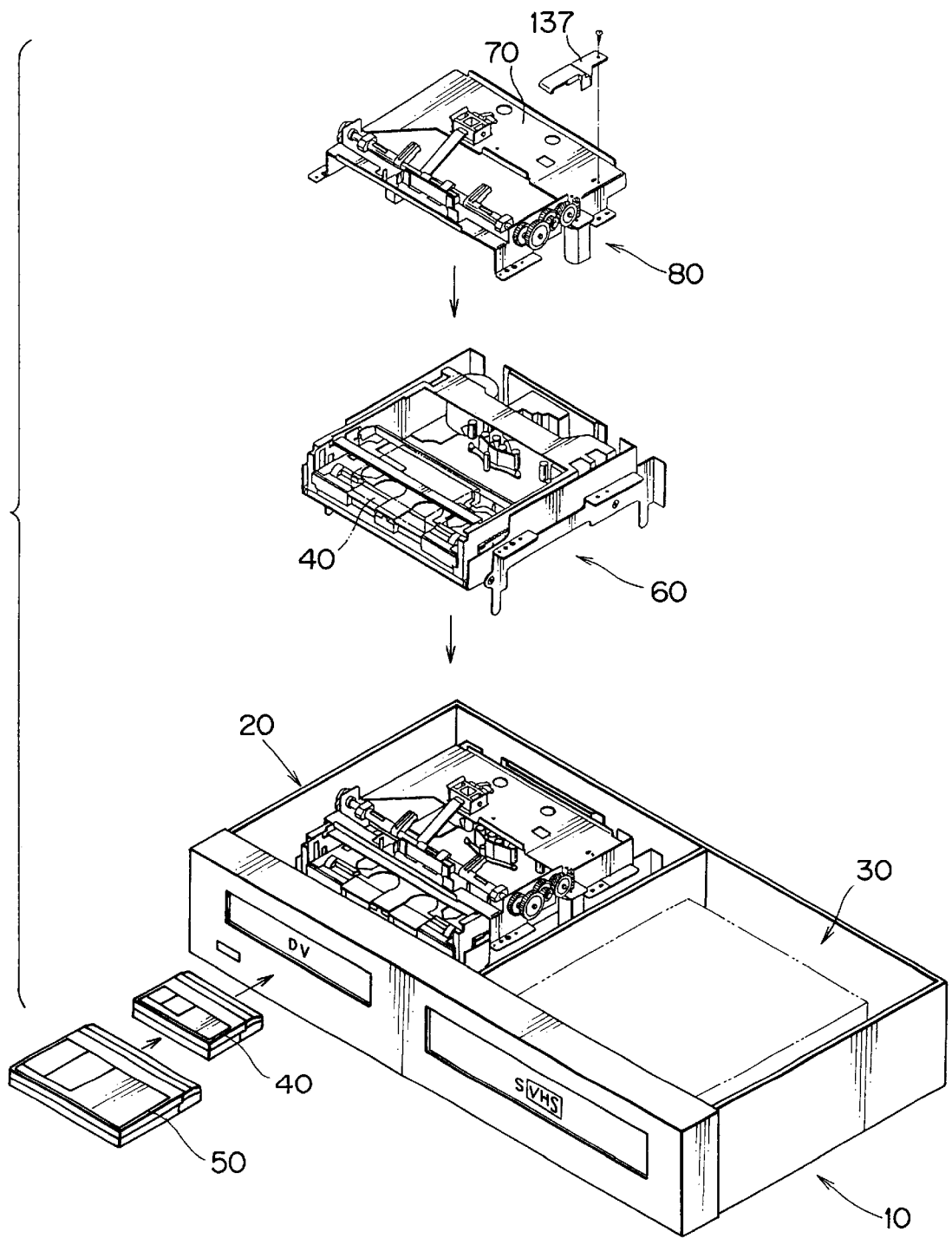
FIG. 1 is a perspective view schematically showing an entire cassette deck to which the present invention is applied.

Referring first to FIG. 1, there is shown a cassette deck to which the present invention is applied. The cassette deck shown is generally denoted at 10 and formed as a double video recorder deck. The double video recorder deck 10 includes a digital mechanical deck 20 provided on the left side in FIG. 1 for accepting and driving a digital video cassette and another mechanical deck 30 provided on the right side in FIG. 1 for accepting and driving a VHS video cassette. The digital mechanical deck 20 on the left side is formed as a compatible mechanical deck having a structure which can receive and drive two different types of digital video cassettes, that is, a small cassette 40 and a large cassette 50.

The digital mechanical deck 20 formed as a compatible mechanical deck includes a digital video deck 60 which can accept and drive the small cassette 40 and the large cassette 50, and a discharging unit 80 provided on a lid section 70 of the digital video deck 60. The discharging unit 80 is mounted on the digital video deck 60, and they are incorporated in the double video recorder deck 10. While an existing digital video deck is used for the digital video deck 60, the discharging unit 80 is so structured that it can move the small cassette 40 by a sufficient discharging amount to a position at which the small cassette 40 can be manually taken out with certainty so that the small cassette 40 can be operated similarly to the large cassette 50 as hereinafter described in detail.

Figure 2:
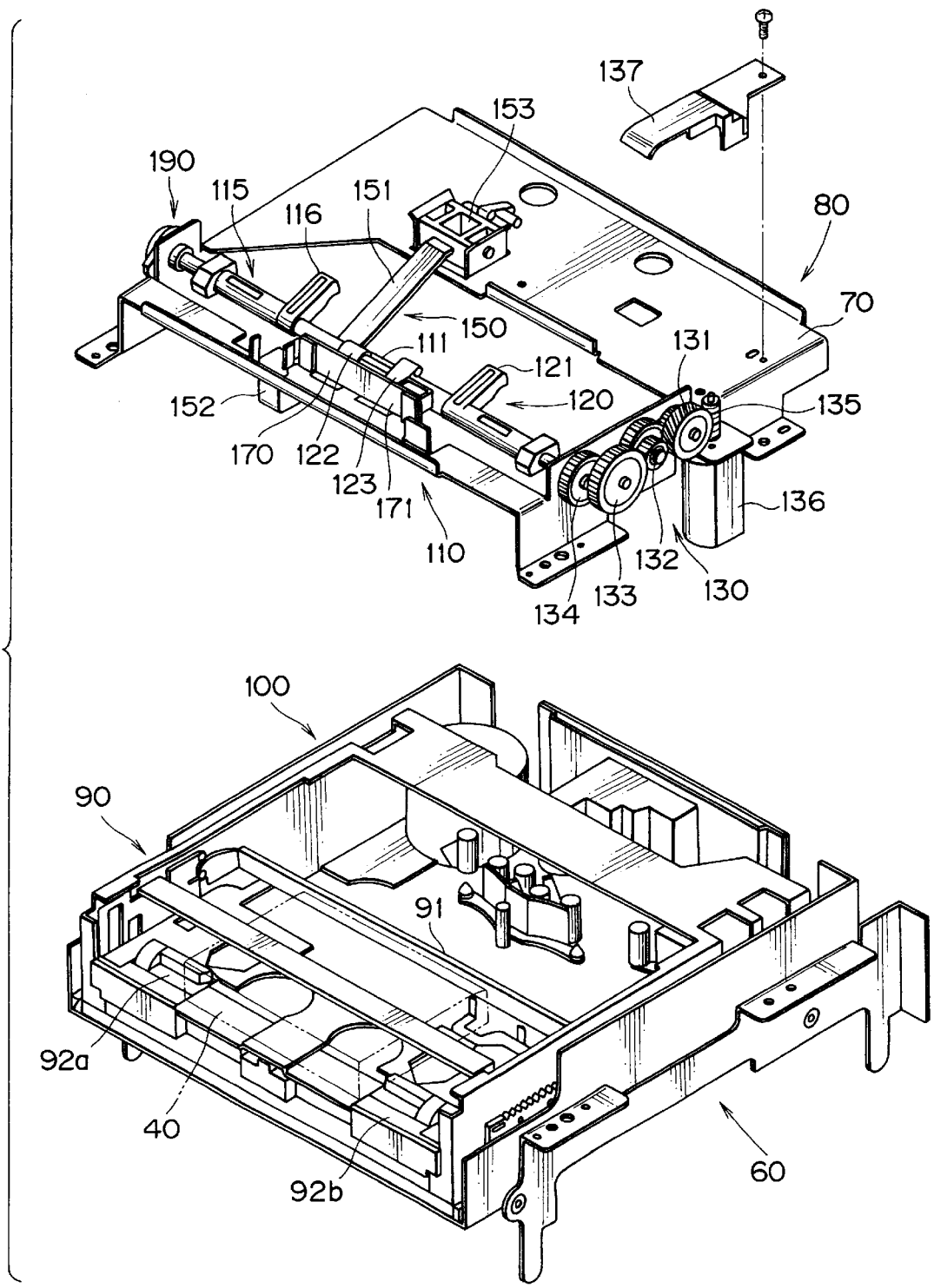
FIG. 2 is a perspective view of a digital video deck of the cassette deck shown in FIG. 1 and a discharging unit mounted on a lid section of the digital video deck.

Referring particularly to FIG. 2, the digital video deck 60 includes a cassette mounting section 90 provided at a front location for accepting and moving the small cassette 40 or the large cassette 50 to a loading position, and a cassette driving section 100 including a mechanism for loading and driving the small cassette 40 or the large cassette 50 for recording or reproduction. The cassette mounting section 90 includes a guide bar 91 for a cassette inserted, and a pair of cassette guide knobs 92a and 92b for guiding, when the small cassette 40 is inserted, the small cassette 40 so that it may be positioned at the center of the entrance. The cassette guide knobs 92a and 92b are mounted for retraction movement. When the small cassette 40 is mounted, the cassette guide knobs 92a and 92b guide the small cassette 40, but when the large cassette 50 is mounted, the cassette guide knobs 92a and 92b are pressed down simultaneously by the large cassette 50 and retracted to a position to or below the plane of the bottom of the large cassette 50.

The discharging unit 80 includes a small cassette discharging section 110 provided at a front end portion of the discharging unit 80 and formed by bending the opposite ends of a single plate member, which forms the lid section 70, in the same direction and removing a substantially central portion of the single plate member as seen in FIG. 2, a discharging driving mechanism section 130 provided on the right side in FIG. 2 for driving pivotal arms, which are hereinafter described, to perform back and forth movement within a range of approximately 180 degrees, a cassette presence detection section 150 for detecting presence of the small cassette 40 in the digital video deck 60, a cassette discharging switch section 170 for detecting presence or absence of a cassette in a discharging position, and a pivotal motion driving limiting section 190 serving as mechanical stoppers for mechanically protecting the small cassette 40 during a discharging movement from the discharging position to a position at which the small cassette 40 can be manually taken out.

The small cassette discharging section 110 forms moving means for pushing at the rear face side of the small cassette 40 by means of the pivotal arms to push out the small cassette 40 to the position at which the small cassette 40 can be manually taken out. The small cassette discharging section 110 includes a rotatable shaft 111 mounted for rotation by a pair of bearings on the opposite sides of the small cassette discharging section 110, and first and second arm sections 115 and 120 mounted at left and right positions of the rotatable shaft 111 for being rotated back and forth over approximately 180 degrees.

The first arm section 115 includes a first pivotal arm 116 for being pivoted to push at the rear face side of the small cassette 40 to push out the small cassette 40, and is secured to the rotatable shaft 111 by a fastening screw.

The second arm section 120 includes a second pivotal arm 121 for being pivoted to push at the rear face side of the small cassette 40 to push out the small cassette 40, a discharging knob 122 for detecting that the small cassette 40 is present at the discharging position, and a taking out knob 123 for detecting that the small cassette 40 is present at the position at which the small cassette 40 can be manually taken out. The second arm section 120 is secured to the rotatable shaft 111 by a fastening screw. It is to be noted that the first and second arm sections 115 and 120 may be formed as a unitary member on and together with the rotatable shaft 111.

Figure 5:
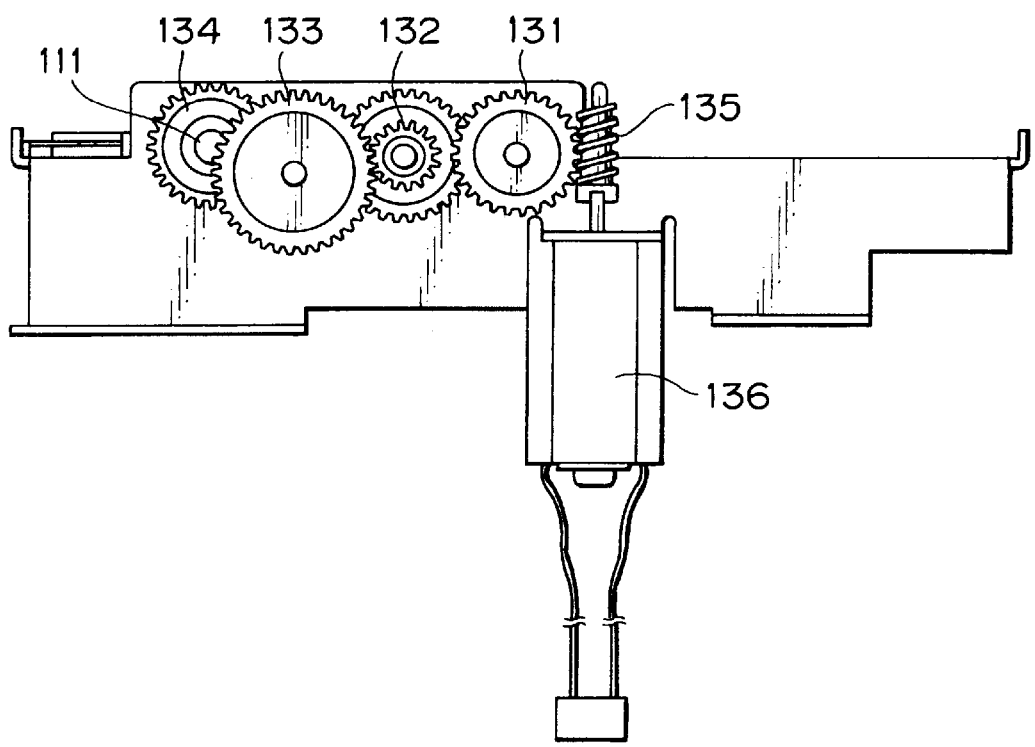
FIG. 5 is a top plan view of a discharging driving mechanism section of the discharging unit of FIG. 2 composed of a plurality of gears.

Referring to FIGS. 2 and 5, the discharging driving mechanism section 130 includes first to fourth speed reduction gears 131, 132, 133 and 134 combined to form a gear train of a predetermined speed reduction ratio for angularly rotating the rotatable shaft 111, a worm gear 135, a drive motor 136 for rotating the worm gear 135, and a cover member 137 for covering over the worm gear 135 and the proximity of the same. The first to fourth gears 131, 132, 133 and 134 can be replaced suitably, and the speed of rotation of the rotatable shaft 111, that is, the discharging speed, and the discharging power can be adjusted freely by changing the numbers of teeth of the worm gear 135 and the gears and the speed reduction ratio of the gear train. The cover member 137 can prevent damage to a cassette tape by scattering of grease applied to the first to fourth gears 131, 132, 133 and 134 and irregular meshing engagement of the worm gear 135 caused by irregularly inclined arrangement of the worm gear 135.

Since the transmission mechanism composed of gears is adopted in this manner, rotating force of the drive motor 136 is transmitted accurately to the rotatable shaft 111 through the gears, and consequently, a malfunction caused by a slip or the like can be prevented. Further, by transmission of the rotating power by the plurality of gears, the drive motor 136 is not rotated readily by inadvertent rotating force applied to the rotatable shaft 111 side, and the first and second pivotal arms 116 and 121 can be prevented from being moved out of their respective regular positions. Furthermore, even if the small cassette 40 is compulsorily pushed in in the reverse direction during a discharging operation, it moves in the thus pushed-in direction against resistance and can be pushed in without disabling the functions of the first and second pivotal arms 116 and 121, worm gear 135 and first to fourth gears 131, 132, 133 and 134.

The cassette presence detection section 150 is formed as a unitary member of a resin and includes an elongated bar 151, a detection knob 152 provided at a front end portion of the bar 151 for detecting presence of a cassette, and a biasing member 153 provided at a rear end portion of the bar 151 for normally biasing the detection knob 152 in a downward direction.

Figure 3:
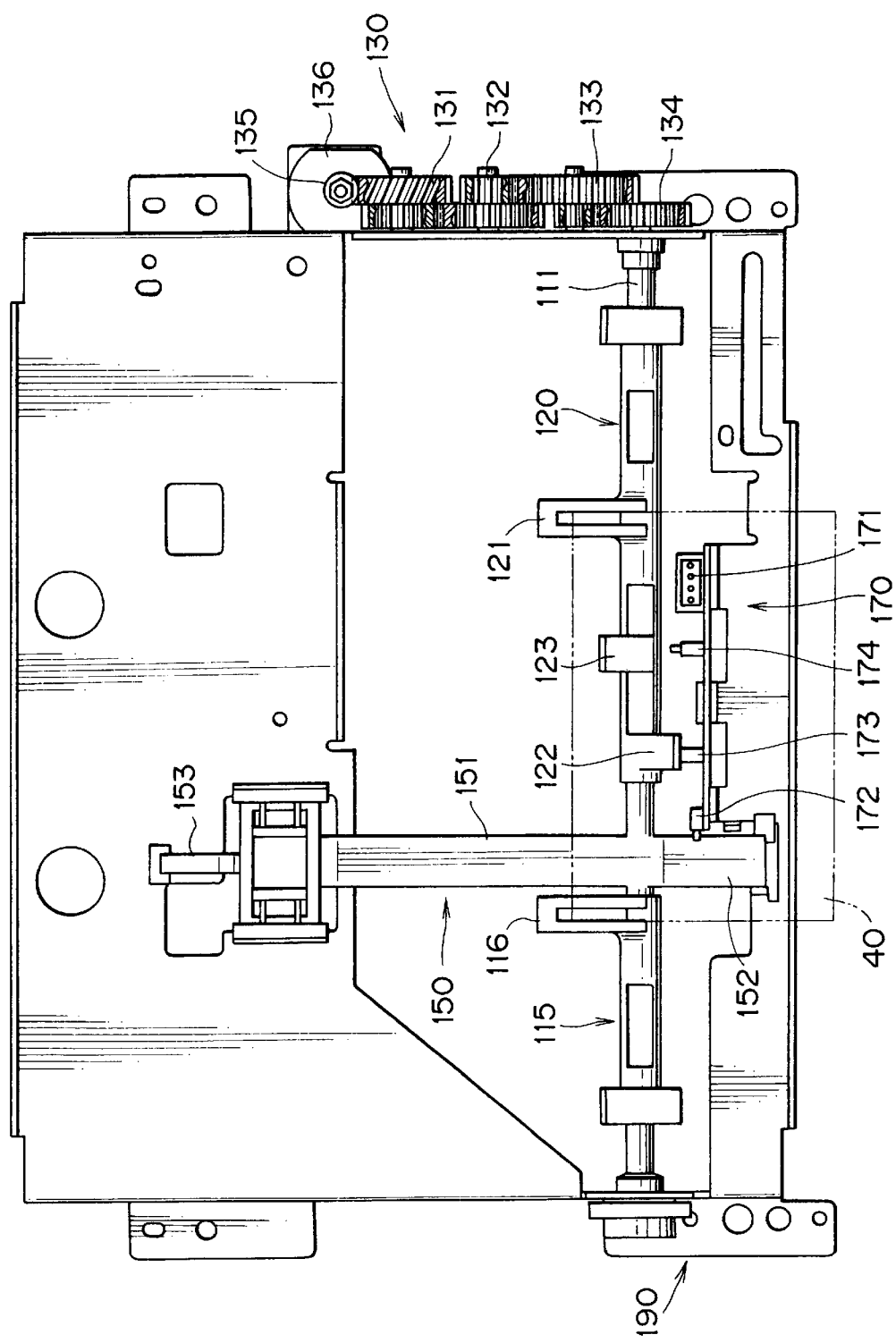
FIG. 3 is a top plan view of the discharging unit of FIG. 2 when a pivotal arm of the discharging unit is at a home position.

The cassette discharging switch section 170 includes a board 171 and three switches provided on the board 171 as particularly shown in FIG. 3. The three switches include a presence detection switch 172 for detecting presence of the small cassette 40, a discharging position detection switch 173 for detecting a discharging position of the small cassette 40, and a taking out position detection switch 174 for detecting movement of the small cassette 40 from the discharging position to the position at which the small cassette 40 can be manually taken out. The switches 172, 173 and 174 are switched on/off by pivotal motion of the cassette presence detection section 150 and the second arm section 120. In particular, the presence detection switch 172 is operated to be switched on/off by the detection knob 152 of the cassette presence detection section 150 and maintains an on state until the small cassette 40 is taken off after it is mounted. The discharging position detection switch 173 is operated to be switched on/off by the discharging knob 122 of the second arm section 120 and exhibits an on state only when the small cassette 40 is positioned at the discharging position. The taking out position detection switch 174 is operated to be switched on/off by the taking out knob 123 of the second arm section 120 and exhibits an on state only when the small cassette 40 is positioned at its taken out position.

Figure 6:
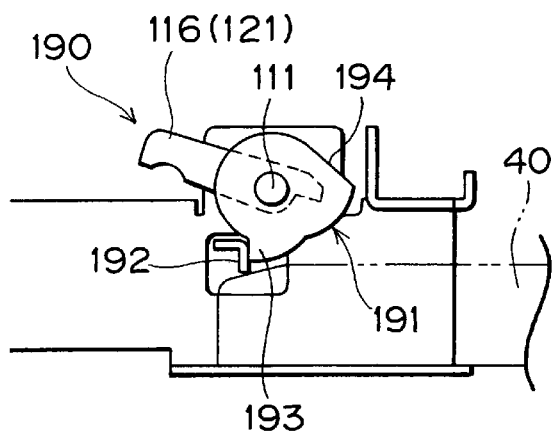
FIG. 6 is a top plan view schematically showing a pivotal motion driving limiting section of the discharging unit of FIG. 2 which mechanically limits pivotal motion of the pivotal arm at its home position.
Figure 7:
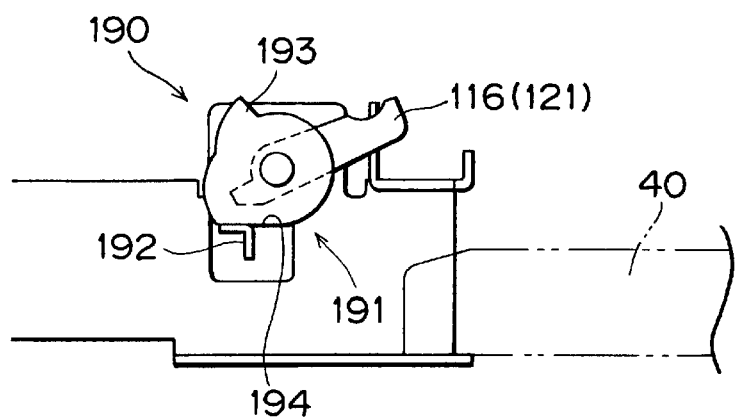
FIG. 7 is a top plan view schematically showing the pivotal motion driving limiting section of FIG. 6 which mechanically limits pivotal motion of the pivotal arm when a cassette is ejected by the pivotal arm.

The pivotal motion driving limiting section 190 is mounted at one end portion of the rotatable shaft 111 as shown in FIGS. 2, 6 and 7 and has a mechanical stopper structure for physically limiting the range of back and forth movement over approximately 180 degrees in addition to the control by the switches 172, 173 and 174 of the cassette discharging switch section 170. The pivotal motion driving limiting section 190 includes a cam 191 mounted for integral rotation with the rotatable shaft 111, and a stopper 192. The cam 191 has a discharging stopper section 193 for stopping pivotal motion of the first and second pivotal arms 116 and 121 in a rearward direction in the inside of the housing at the discharging position, and a taking out stopper 194 for stopping pivotal motion of the first and second pivotal arms 116 and 121 in a forward direction in the inside of the housing when movement of the small cassette 40 to the taken out position is completed.

Since the pivotal motion driving limiting section 190 having the structure described above is provided, first in the discharging position from which the small cassette 40 is discharged as shown in FIG. 6, the discharging stopper section 193 is contacted with and stopped by the stopper 192 in a position in which the first and second pivotal arms 116 and 121 are directed obliquely upwardly. If the small cassette 40 is discharged in this state, then the first and second pivotal arms 116 and 121 begin to pivot in the inward direction of the housing and push at positions of the small cassette 40 at the opposite end positions of the rear face to move the small cassette 40 while they are pivoted. Then, after the small cassette 40 is moved to the taking out position, the taking out stopper 194 and the stopper 192 are contacted with each other to stop the first and second pivotal arms 116 and 121 in a position in which the first and second pivotal arms 116 and 121 are directed obliquely upwardly. If the small cassette 40 is taken out in this state, then the first and second pivotal arms 116 and 121 are pivoted in the opposite inward direction of the housing to the discharging position of the small cassette 40 illustrated in FIG. 6, thereby ending the sequence of operations. In this manner, the pivotal motion of the first and second pivotal arms 116 and 121 is provided with a stopper function by mechanical stoppers so that, while the positions of the first and second pivotal arms 116 and 121 are controlled by the switches, even if a pivoted position or pivoting direction of the first and second pivotal arms 116 and 121 is brought out of order by an overrun by an inertia, an error in mounting, a malfunction of an operation control section not shown and so forth, it may have no influence on the other components.

Now, operation of the discharging unit 80 having the structure described above is described below. It is to be noted that the pivotal motion driving limiting section 190 which mechanically limits the angular rotation of the rotatable shaft 111 is described hereinabove, overlapping description of it is omitted here to avoid redundancy.

Figure 4:
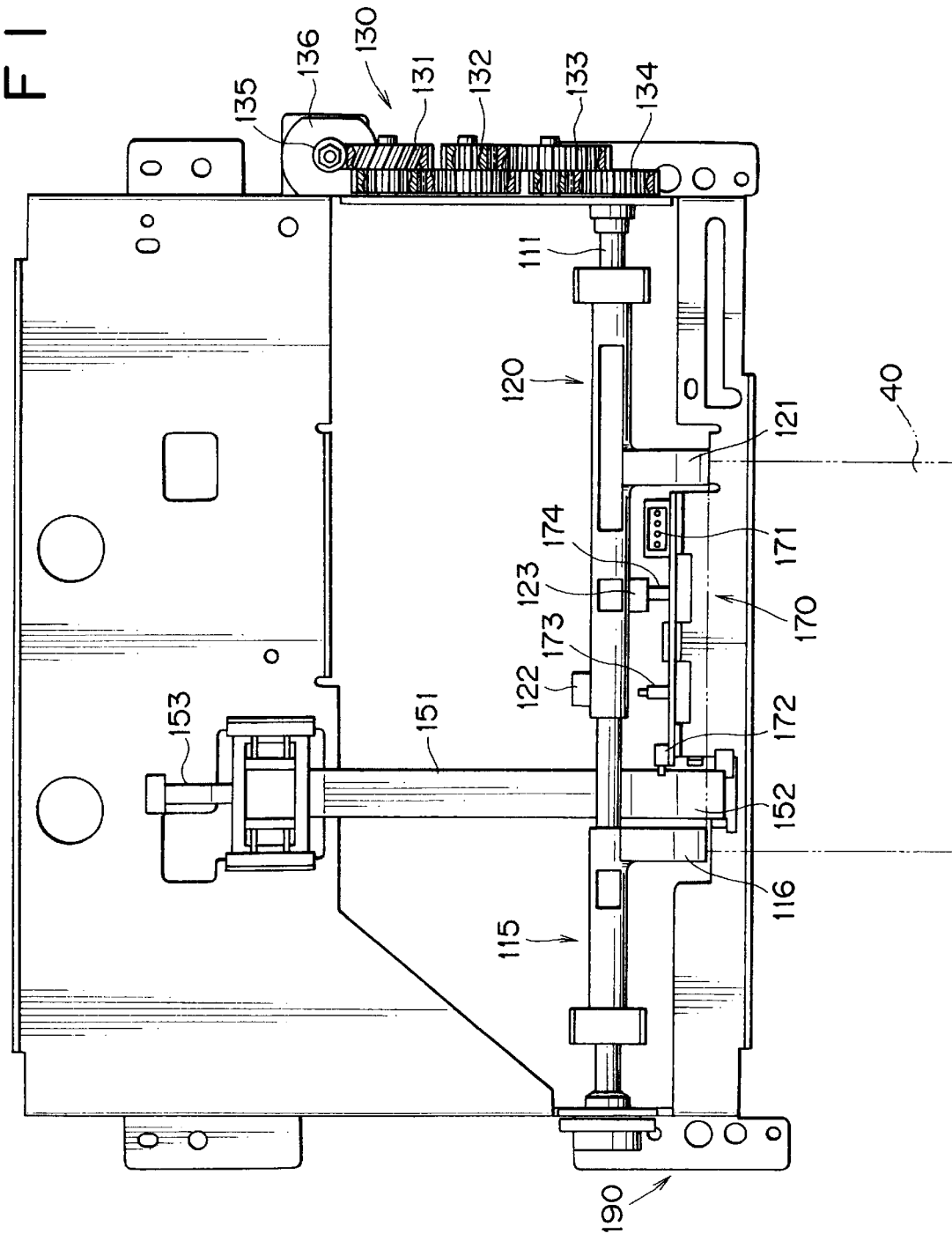
FIG. 4 is a top plan view of the discharging unit of FIG. 2 when a cassette is discharged by the pivotal arm of the discharging unit.

FIG. 3 shows the first and second pivotal arms 116 and 121 in a state wherein the small cassette 40 is present at the discharging position. The first and second pivotal arms 116 and 121 are positioned at a position at which they do not interfere with the small cassette 40 to be mounted and do not project upwardly from the housing. FIG. 4 shows the first and second pivotal arms 116 and 121 at another position at which the small cassette 40 is positioned at the taking out position after movement from the discharging position.

First, if the small cassette 40 is manually inserted and pushed in, then it is drawn in and loaded by the cassette loading mechanism. By the loading operation, the small cassette 40 is drawn in and moved down until it is received by a reel base not shown. When the reception by the reel base is detected, the rotatable shaft 111 is angularly rotated to a standby position for pushing out the small cassette 40, that is, the discharging position, at which stopping and confirmation operations of the small cassette 40 are performed (refer to FIG. 6).

Then, if an EJECT button not shown is depressed in this state, then a cassette unloading operation is performed from the tape loading state and a discharging operation is performed until the cassette is moved to the discharging position. Where the cassette moved to the discharging position is the large cassette 50, it can be manually taken out from the discharging position, and consequently, no later operation described below is preformed.

On the other hand, where the cassette moved to the discharging position is the small cassette 40, when it is at the discharging position, the first and second pivotal arms 116 and 121 are positioned in a state in which they are directed obliquely upwardly and do not interfere with a movement of the small cassette 40 (FIG. 6), that is, a home position. In this state, when the small cassette 40 is positioned at the discharging position, the presence detection switch 172 is in an on state by the side face of the detection knob 152, and the discharging position detection switch 173 is in an on state by the discharging knob 122. When all of the conditions mentioned are met, a discharging operation can be performed. In particular, when a discharging operation is started in this state, the drive motor 136 is energized first to start rotation of the worm gear 135, and the rotating force of the worm gear 135 is transmitted to the rotatable shaft 111 through the first to fourth gears 131, 132, 133 and 134 so that the first and second pivotal arms 116 and 121 begin to be pivoted downwardly in an inward direction of the housing.

Here, if the small cassette 40 is caught and stopped by some trouble during its movement, then the pivotal shaft 111 is angularly rotated in the reverse direction after several seconds (two seconds in the embodiment) so that the first and second pivotal arms 116 and 121 are returned to the initial home position.

When the small cassette 40 is being pushed out regularly, it is pushed at the opposite end positions of the rear face thereof by the free ends of the first and second pivotal arms 116 and 121 while the first and second pivotal arms 116 and 121 continue their pivotal motion as seen in FIG. 4 until the small cassette 40 is moved to the taking out position. After the discharging operation of the small cassette 40 is completed by the pivotal motion of the first and second pivotal arms 116 and 121, when the taking out knob 123 operates the taking out position detection switch 174 to an on state, the angular rotation of the rotatable shaft 111 is stopped. While the small cassette 40 is present at the taking out position, the presence detection switch 172 continues its on state. Then, if the small cassette 40 is manually taken out from the taking out position, then the presence detection switch 172 is brought into an off-state. Consequently, the first and second pivotal arms 116 and 121 begin to be pivoted in the reverse direction from the forwardly stopping position (refer to FIG. 7). When the first and second pivotal arms 116 and 121 are pivoted to the position in which they are directed obliquely upwardly and do not interfere with a movement of the small cassette 40, that is, to the home position, they are stopped (refer to FIG. 6).

While a preferred embodiment of the present invention has been described using specific terms, such description is for illustrative purposes only, and it is to be understood that changes and variations may be made without departing from the spirit or scope of the following claims.

What is claimed is:

1. A cassette deck comprising:

a housing; and a mounting and discharging mechanism capable of mounting and discharging any of a small cassette and a large cassette, said mounting and discharging mechanism including moving means for pushing at a rear face of said small cassette to move said small cassette to a position at which said small cassette can be manually taken out, wherein said moving means includes a pivotal arm mounted for pivotal back and forth movement over approximately 180 degrees on an inner side of said housing.

2. The cassette deck according to claim 1, further comprising a mechanical deck in which a loading mechanism for loading the small cassette or the large cassette in position is incorporated, and wherein said moving means is provided on a lid member of said mechanical deck.

3. The cassette deck according to claim 1, wherein said moving means further includes a gear train composed of a plurality of speed reduction gears, and the pivotal back and forth movement over approximately 180 degrees of said pivotal arm is provided by said gear train.

4. The cassette deck according to claim 1, wherein the pivotal back and forth movement over approximately 180 degrees is limited by mechanical stoppers.

5. A cassette deck comprising:

a housing; and a mounting and discharging mechanism capable of mounting and discharging any of a small cassette and a large cassette, said mounting and discharging mechanism including moving means for pushing at a rear face of said small cassette to move said small cassette to a position at which said small cassette can be manually taken out, wherein said moving means includes a pair of pivotal arms mounted for pivotal back and forth movement over approximately 180 degrees on an inner side of said housing for pushing at opposite end positions of the rear face of said small cassette.

6. The cassette deck according to claim 5, further comprising a mechanical deck in which a loading mechanism for loading the small cassette or the large cassette in position is incorporated, and wherein said moving means is provided on a lid member of said mechanical deck.

* * * * *